(12) United States Patent
Teramoto et al.

(10) Patent No.: US 11,173,648 B2
(45) Date of Patent: Nov. 16, 2021

(54) THERMOFORMING DEVICE AND THERMOFORMING METHOD

(71) Applicant: Asano Laboratories Co., Ltd., Aichi (JP)

(72) Inventors: Kazunori Teramoto, Aichi-gun (JP); Masanobu Nihira, Aichi-gun (JP); Hideki Usami, Aichi-gun (JP)

(73) Assignee: Asano Laboratories Co., Ltd., Aichi (JP)

( * ) Notice: Subject to any disclaimer, the term of this patent is extended or adjusted under 35 U.S.C. 154(b) by 14 days.

(21) Appl. No.: 15/770,844

(22) PCT Filed: Oct. 17, 2016

(86) PCT No.: PCT/JP2016/080682
§ 371 (c)(1),
(2) Date: Apr. 25, 2018

(87) PCT Pub. No.: WO2017/073390
PCT Pub. Date: May 4, 2017

(65) Prior Publication Data
US 2018/0354188 A1 Dec. 13, 2018

(30) Foreign Application Priority Data

Oct. 30, 2015 (JP) .............................. JP2015-215036

(51) Int. Cl.
*B29C 51/42* (2006.01)
*B29C 51/16* (2006.01)
(Continued)

(52) U.S. Cl.
CPC .......... *B29C 51/425* (2013.01); *B29C 51/165* (2013.01); *B29C 51/02* (2013.01);
(Continued)

(58) Field of Classification Search
None
See application file for complete search history.

(56) References Cited

U.S. PATENT DOCUMENTS

2006/0113716 A1\* 6/2006 Binda ................... B29C 51/267
264/545
2012/0211928 A1\* 8/2012 Takai ...................... B29C 51/10
264/553
2015/0202852 A1\* 7/2015 Miyagawa .............. B32B 38/12
156/285

FOREIGN PATENT DOCUMENTS

CN 101450518 A 6/2009
CN 102848698 A 1/2013
(Continued)

OTHER PUBLICATIONS

Machine English Translation of JP-2000190099-A, Retrieved Sep. 24, 2020 (Year: 2000).\*

(Continued)

Primary Examiner — Peter L Vajda
Assistant Examiner — Adrianna N Konves
(74) Attorney, Agent, or Firm — Wood Herron & Evans LLP

(57) ABSTRACT

A thermoforming device includes: an upper hot plate including a first heating surface configured to heat a sheet from above; a lower hot plate including a second heating surface configured to heat the sheet from below; and a substrate-supplying unit including a base configured to hold a molded substrate, and configured to attach the molded substrate to and detach the molded substrate from the base and to dispose the molded substrate at a molding position below the first heating surface with the sheet interposed therebetween, in which the upper hot plate and the lower hot plate are configured to heat the sheet simultaneously from an upper surface and a lower surface of the sheet, the lower hot plate (Continued)

is provided to be movable in a horizontal direction with respect to a position below the upper hot plate, and the thermoforming device die-molds or adheres, onto the molded substrate held by the base, the sheet softened by being heated by the upper hot plate and the lower hot plate.

6 Claims, 9 Drawing Sheets

(51) Int. Cl.
| | |
|---|---|
| B29C 51/10 | (2006.01) |
| B29C 51/12 | (2006.01) |
| B29C 51/02 | (2006.01) |
| B29C 51/36 | (2006.01) |
| B29C 51/20 | (2006.01) |
| B29C 51/14 | (2006.01) |
| B29C 51/26 | (2006.01) |
| B29K 623/00 | (2006.01) |

(52) U.S. Cl.
CPC .............. *B29C 51/10* (2013.01); *B29C 51/12* (2013.01); *B29C 51/14* (2013.01); *B29C 51/20* (2013.01); *B29C 51/261* (2013.01); *B29C 51/36* (2013.01); *B29C 2791/006* (2013.01); *B29C 2791/007* (2013.01); *B29C 2793/0009* (2013.01); *B29C 2793/009* (2013.01); *B29C 2793/0027* (2013.01); *B29C 2793/0081* (2013.01); *B29C 2795/002* (2013.01); *B29K 2623/00* (2013.01)

(56) References Cited

FOREIGN PATENT DOCUMENTS

| | | | |
|---|---|---|---|
| JP | 03021426 A | 1/1991 | |
| JP | 06143329 A | 5/1994 | |
| JP | 2000190099 A | * 7/2000 | ........... B30B 15/064 |
| JP | 3102916 B2 | 10/2000 | |
| JP | 2007160604 A | 6/2007 | |
| JP | 2011136471 A | 7/2011 | |
| JP | 2015136856 A | 7/2015 | |

OTHER PUBLICATIONS

Chinese Patent Office, Office Action issued in CN 201680062316.0 dated Aug. 15, 2019, 22 pages.

PCT Office, International Search Report issued in PCT Application No. PCT/JP2016/080682 dated Dec. 20, 2016, 4 pages.

* cited by examiner

THERMOFORMING DEVICE AND THERMOFORMING METHOD

TECHNICAL FIELD

The present invention relates to a thermoforming device and a thermoforming method.

Priority is claimed on Japanese Patent Application No. 2015-215036, filed Oct. 30, 2015, the content of which is incorporated herein by reference.

BACKGROUND ART

In general, as an apparatus for attaching a cover sheet (hereinafter, referred to as a sheet) to an outer surface of a molded substrate, a vacuum press lamination-forming apparatus using radiation heating in upper and lower chambers, a thermoforming device using hot plate heating, or the like, is known.

For example, Patent Document 1 discloses a vacuum press lamination-forming apparatus. The vacuum press lamination-forming apparatus includes upper and lower chambers. The lower chamber can set a sheet to a circumferential edge portion close to the upper chamber while accommodating a molded substrate. The upper chamber has a hot plate including a heater thereabove. The upper chamber is connected to a vacuum tank and a pressure tank and can evacuate and pressurize the inside of the chamber constituted by the upper and lower chambers.

The lower chamber is connected to the vacuum tank and can evacuate the inside of the chamber.

In the vacuum press lamination-forming apparatus disclosed in Patent Document 1, the lower chamber is depressurized in a state in which an intermediate chamber is depressurized and a synthetic resin sheet is pulled away from the substrate. Accordingly, air between the substrate and the synthetic resin sheet is sufficiently discharged without being hindered by the synthetic resin sheet. After that, the upper chamber is pressurized. For this reason, the synthetic resin sheet is adhered to the substrate in a vacuum state due to a pressure difference between the upper chamber and the lower chamber.

DOCUMENT OF RELATED ART

PATENT DOCUMENT

[Patent Document 1] Japanese Patent No. 3102916

SUMMARY OF INVENTION

Technical Problem

However, the thermoforming method in the related art has the following problems. That is, the sheet is suctioned to a heating surface of the hot plate from one direction which is from an upper side and heated. For this reason, an adhering surface (a lower surface) of the sheet needs to be heated from an upper surface of the sheet until the adhering surface is softened to a state required for coating. For this reason, a temperature of the heating surface is increased and a heating time when a sheet upper surface is absorbed to the heating surface of the hot plate is increased. For this reason, a surface roughness of the heating surface may be transferred to the sheet upper surface. Thus, since the sheet to which the surface roughness is transferred when the front surface of the molded substrate is coated with the sheet appears on the front surface of the thermoformed article, there is room for improvement in design properties. In addition, in mass production of thermoformed articles, it is required to shorten the heating time of the sheet. In particular, when the sheet is thick, a heating time for softening the sheet is necessary. For this reason, it has been required to reduce the molding time.

In consideration of the above-mentioned problems, the present invention provides a thermoforming device and a thermoforming method allowing a reduction in heating time of a sheet to be achieved and design properties of a thermoformed article to be improved.

Solution to Problem

A thermoforming device according to a first aspect of the present invention includes an upper hot plate including a first heating surface configured to heat a sheet from above; a lower hot plate including a second heating surface configured to heat the sheet from below; and a substrate-supplying unit including a base configured to hold a molded substrate, and configured to attach the molded substrate to and detach the molded substrate from the base and to dispose the molded substrate at a molding position below the first heating surface with the sheet interposed therebetween, wherein the upper hot plate and the lower hot plate are configured to heat the sheet simultaneously from an upper surface and a lower surface of the sheet, the lower hot plate is provided to be movable in a horizontal direction with respect to a position below the upper hot plate, and the thermoforming device die-molds or adheres, onto the molded substrate held by the base, the sheet softened by being heated by the upper hot plate and the lower hot plate.

A thermoforming method according to a second aspect of the present invention is a thermoforming method using a thermoforming device including: an upper hot plate including a first heating surface configured to heat a sheet from above; a lower hot plate including a second heating surface configured to heat the sheet from below; and a substrate-supplying unit including a base configured to hold a molded substrate, and configured to attach the molded substrate to and detach the molded substrate from the base, and to dispose the molded substrate at a molding position below the first heating surface with the sheet interposed therebetween, the thermoforming method including: installing the molded substrate on the base and disposing the base at the molding position; disposing the lower hot plate at a position below the upper hot plate with a gap therebetween; disposing the sheet between the upper hot plate and the lower hot plate; heating upper and lower surfaces of the sheet using the upper hot plate and the lower hot plate, respectively; retracting the lower hot plate from the position below the upper hot plate and forming a closed space below the sheet and surrounded by the sheet and the substrate-supplying unit; and depressurizing an inside of the closed space, and die-molding the sheet softened by the heating, or adhering the sheet to the molded substrate.

In the above-mentioned aspects, the upper surface side of the sheet is heated by the first heating surface of the upper hot plate, and the lower surface side is heated by the second heating surface of the lower hot plate. Accordingly, both of the upper and lower surfaces of the sheet are simultaneously heated. For this reason, a reduction in heating time can be achieved. Then, after the sheet is softened by the heating, as the lower hot plate is moved in a lateral direction from the position below the upper hot plate, the sheet can be uniformly die-molded, or coated on the entire front surface of the molded substrate of the substrate-supplying unit.

In this way, since both of the upper and lower surfaces of the sheet are simultaneously heated by the upper hot plate and the lower hot plate, a temperature of the upper hot plate can be lowered to heat the sheet. For this reason, it is possible to prevent transfer of a surface roughness of the first heating surface to the upper surface of the sheet due to heating of the upper hot plate, and reduce deterioration in design properties of the front surface of the thermoformed product after thermoforming.

In addition, in the above-mentioned aspect, the lower surface side of the sheet to which an adhesive agent is adhered can also be heated by the lower hot plate. For this reason, the adhesive agent can be sufficiently softened, and an adhesive strength of the sheet adhered to the molded substrate can be improved.

Further, in the above-mentioned aspect, since both of the upper and lower surfaces of the sheet can be heated, the embodiment can also be applied to a sheet having a large thickness. That is, even in a sheet having a thickness such that the lower surface of the sheet cannot be heated to a required temperature when heated by only the upper hot plate, the entire sheet can be heated to a sheet-softening temperature required for die-molding, or coating, by heating the lower surface of the sheet using the lower hot plate.

In addition, in the above-mentioned aspect, since the upper hot plate and the lower hot plate are individually provided, the temperature can be adjusted by applying different temperatures between the upper hot plate and the lower hot plate. For this reason, for example, the temperature of the lower surface of the sheet can be increased to higher than that of the upper surface of the sheet, the upper surface of the sheet can prevent transfer due to a high temperature of the upper hot plate, and the lower surface of the sheet can sufficiently soften an adhesive agent using a high heating temperature of the lower hot plate. Accordingly, according to conditions of the sheet such as a material, a thickness dimension, or the like, of the sheet, appropriate heating with respect to the sheet can be performed, and a quality of the thermoformed article can be improved.

In the above-mentioned first aspect, the upper hot plate may suction the sheet to the first heating surface and may contact and heat the upper surface of the sheet, and the lower hot plate may be disposed below the sheet with a gap therebetween, and may be configured to heat the lower surface of the sheet using radiant heat from the second heating surface.

In the above-mentioned aspect, the upper hot plate can be heated by suctioning and bringing the sheet into contact with the first heating surface. Meanwhile, the lower hot plate is configured to heat the lower surface of the sheet using radiant heat from the second heating surface. For this reason, both of the upper and lower surfaces of the sheet can be heated by a simple structure including only, for example, a heater configured to heat the second heating surface only.

In the above-mentioned first aspect, the substrate-supplying unit may be provided to be movable between the molding position disposed below the upper hot plate and a retreat position provided with a gap from the molding position.

In the above-mentioned aspects, during heating of the sheet, the substrate-supplying unit can be retracted from the molding position to dispose the lower hot plate at the molding position. Then, after termination of the heating of the lower hot plate, the lower hot plate is retracted from the molding position. Then, the substrate-supplying unit can be disposed at the molding position to die-mold the sheet into shape with respect to the molded substrate, or cover the molded substrate with the sheet. For this reason, since the lower hot plate and the substrate-supplying unit can be exchanged with each other at the molding position, the entire height of the thermoforming device can be suppressed.

Effects of Invention

According to the thermoforming device and the thermoforming method of the aspect of the present invention, a reduction in heating time of a sheet can be achieved, and improvement of design properties of a thermoformed product can be achieved.

DESCRIPTION OF EMBODIMENTS

Hereinafter, a thermoforming device and a thermoforming method according to an embodiment of the present invention will be described with reference to the accompanying drawings.

Figure 1:
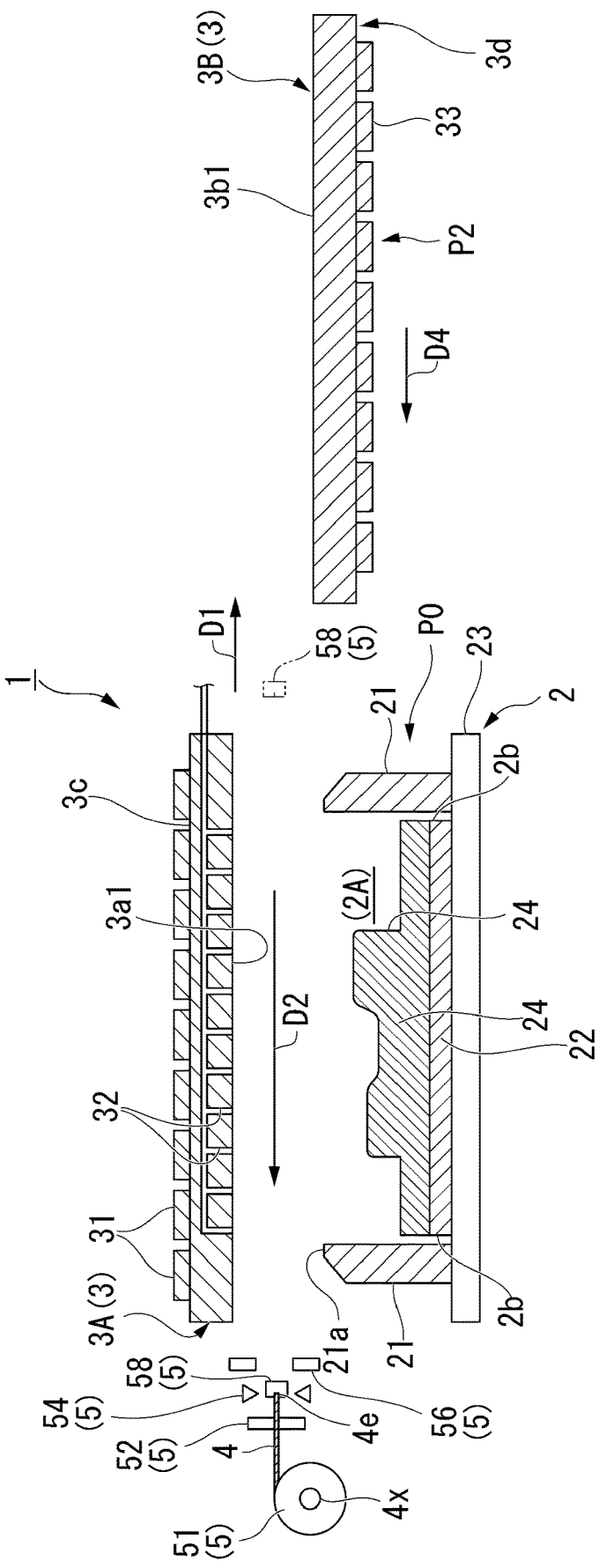
FIG. 1 is a side view showing a configuration of a thermoforming device according to an embodiment of the present invention, and a side cross-sectional view of respective parts.
Figure 2:
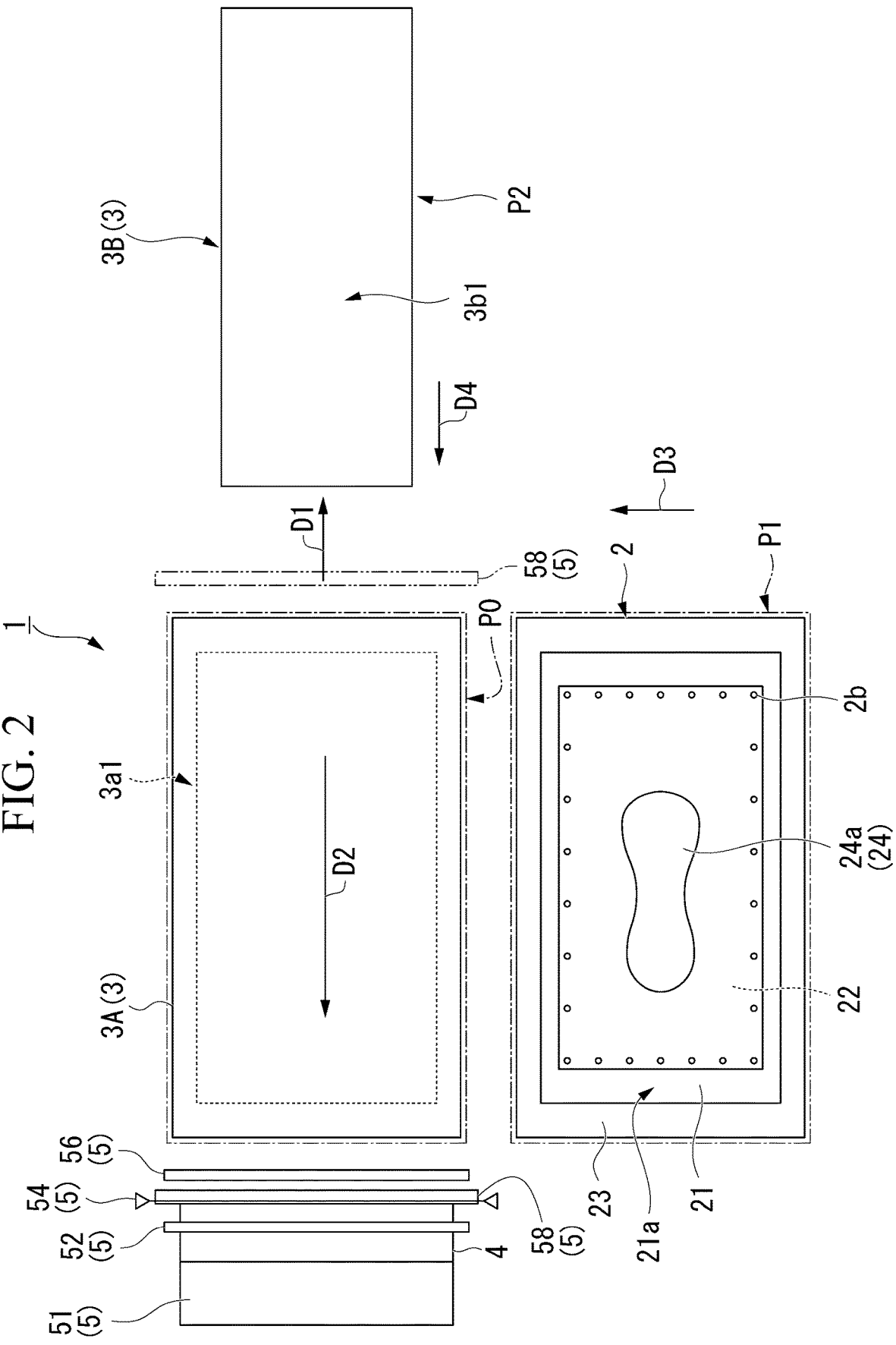
FIG. 2 is a plan view showing the configuration of the thermoforming device shown in FIG. 1.
Figure 3:
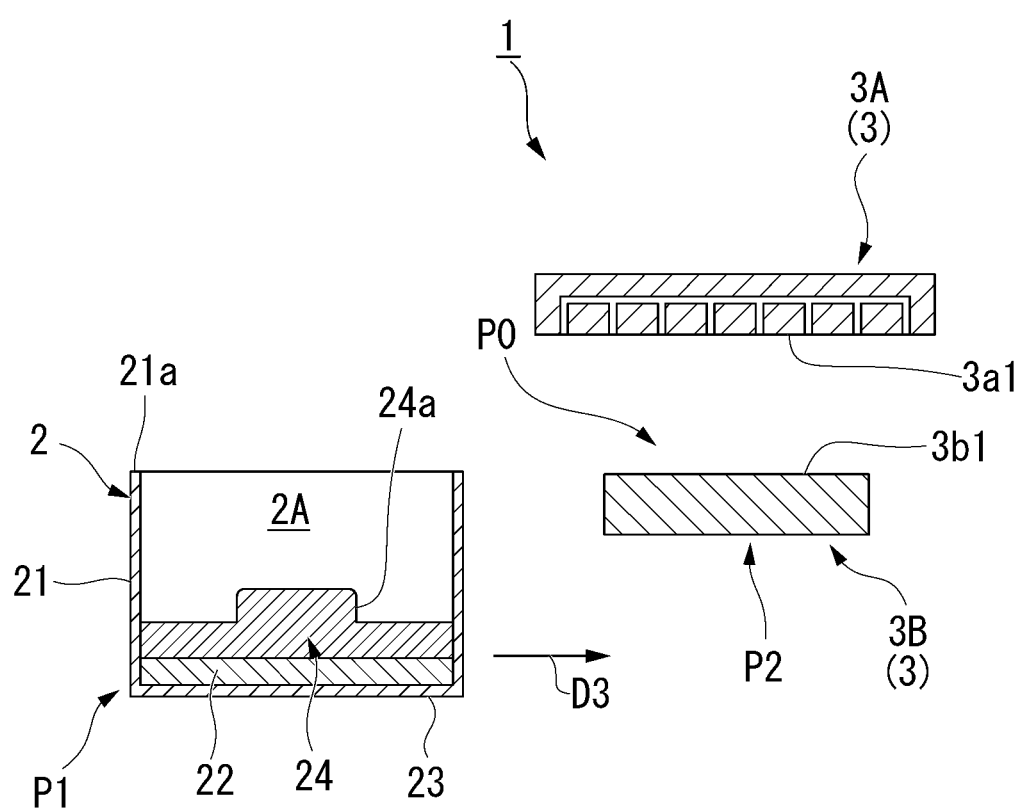
FIG. 3 is a side cross-sectional view showing the respective parts of the thermoforming device shown in FIG. 1 when seen in a moving direction of a lower hot plate.
Figure 7:
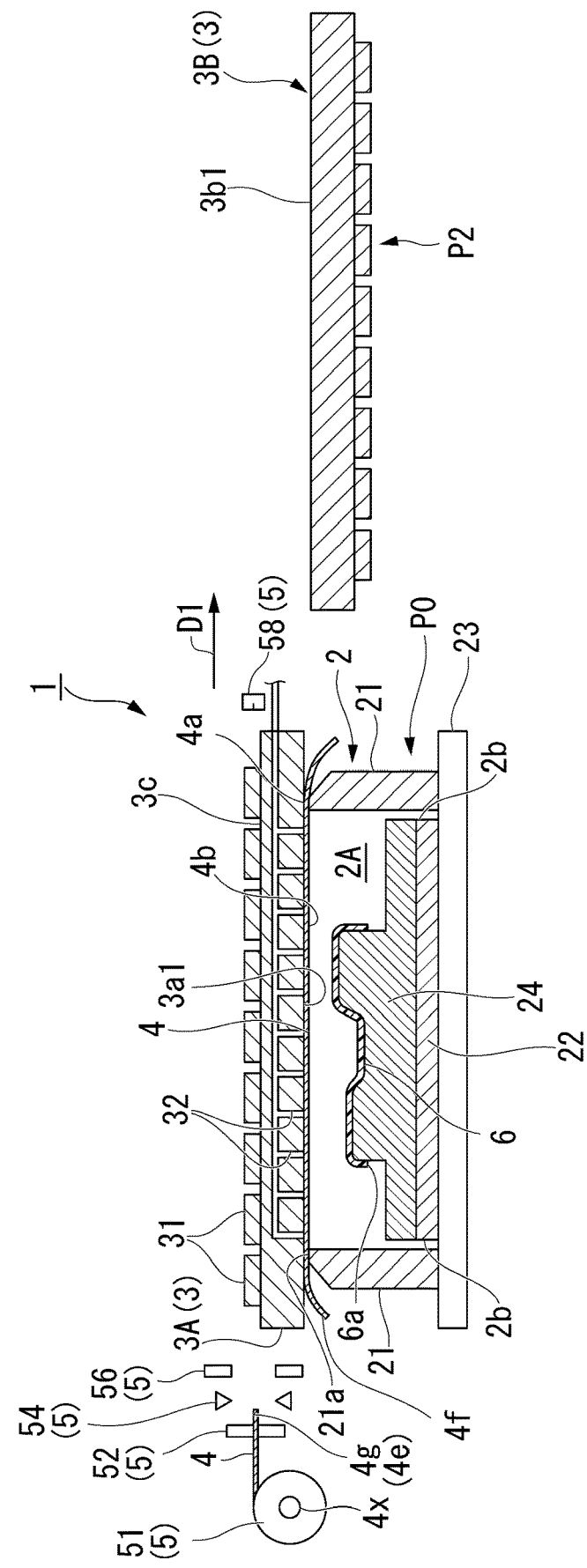
FIG. 7 is a side view describing the thermoforming method following FIG. 6.

As shown in FIGS. 1 to 3, a thermoforming device 1 according to the embodiment employs a hot plate heating method. The thermoforming device 1 is a device configured to cover a front surface 6a of a molded substrate 6 with a sheet 4 softened by heating hot plates 3 (an upper hot plate 3A and a lower hot plate 3B). The hot plates 3 (the upper hot plate 3A and the lower hot plate 3B) are installed as a pair of upper and lower hot plates. As shown in FIG. 7, the molded substrate 6 is disposed in a chamber 2A of a lower frame 2 (a substrate-supplying unit).

Here, as a thermoformed article 6A (see FIG. 9), for example, parts having front and back surfaces such as automobile parts or the like are employed. The thermoformed product 6A is a molded product that is thermoformed by suctioning the sheet 4, which is softened by heating, onto the front surface 6a of the molded substrate 6 formed of a resin and covering the front surface 6a with the sheet 4. In the embodiment, the molded substrate 6 has a capped cylindrical shape.

The thermoforming device 1 includes the lower frame 2, the upper hot plate 3A and the lower hot plate 3B. The lower frame 2 has a space (the chamber 2A) in which the molded substrate 6 shown in FIG. 7 can be accommodated. The upper hot plate 3A has a first heating surface 3a1 configured to heat the sheet 4 from above. The lower hot plate 3B has a second heating surface 3b1 configured to heat the sheet 4 from below. In addition, a sheet transport apparatus 5 configured to supply the sheet 4 to heating surfaces 3a1 and 3b1 of the hot plates 3A and 3B is provided in the thermoforming device 1 according to the embodiment.

The lower frame 2, the upper hot plate 3A and the lower hot plate 3B are individually provided. The upper hot plate 3A is disposed above the lower frame 2 disposed at a predetermined molding position P0 and provided to be vertically movable with respect to the lower frame 2. The lower frame 2 is provided to be movable between the molding position P0 and a first retreat position P1 in a lateral direction (a horizontal direction) (an arrow D3 direction). In addition, the lower hot plate 3B is provided to be movable between the molding position P0 disposed below the upper hot plate 3A with a gap therebetween and a second retreat position P2 in a lateral direction (a horizontal direction) (an arrow D4 direction). The second retreat position P2 is a position different from the above-mentioned first retreat position P1. The lower frame 2 and the lower hot plate 3B are disposed not to interfere with each other. That is, when either one of these is disposed at the molding position P0, the other is disposed at the retreat position P1 or P2. Further, in the embodiment, a moving direction (the lateral direction D3) of the lower frame 2 and a moving direction (the lateral direction D4) of the lower hot plate 3B are perpendicular to each other.

Here, each operations of the lower frame 2, the upper hot plate 3A, the lower hot plate 3B and the sheet transport apparatus 5 are controlled by a control unit (not shown).

Further, while not shown in particular, a cutting tool configured to trim off unnecessary portions of the sheet 4 covering the molded substrate 6 is provided in the thermoforming device 1 according to the embodiment.

The lower frame 2 is formed from a metal member formed of stainless steel or the like in a rectangular shape when seen in plan view. The lower frame 2 includes a sidewall 21 having four surfaces, a bottom panel 22 (a base) corresponding to a bottom portion, and a frame stand 23 on which the sidewall 21 and the bottom panel 22 are placed. A substrate tool 24 configured to hold the molded substrate 6 is fixed onto the bottom panel 22 in the chamber 2A on an inner side surrounded by the bottom panel 22 and the sidewall 21.

The sidewall 21 is provided such that a frame upper edge portion 21a is higher than the accommodated substrate tool 24 and the molded substrate 6 held by the substrate tool 24. The frame upper edge portion 21a is a portion that sandwiches the sheet 4 between the upper hot plate 3A and the frame upper edge portion 21a. That is, the upper hot plate 3A air-tightly contacts the frame upper edge portion 21a with the sheet 4 interposed therebetween, and thus, the lower frame 2 and the upper hot plate 3A are in a closed state and the inside of the chamber 2A becomes a closed space. For this reason, in a state in which the sheet 4 is sandwiched between the frame upper edge portion 21a and the upper hot plate 3A, the space is air-tightly divided into upper and lower spaces with the sheet 4 interposed therebetween.

The bottom panel 22 is formed in a shape smaller than that of the upper hot plate 3A when seen in plan view, and provided on the frame stand 23.

The frame stand 23 is provided to be movable on a floor between the molding position P0 and the first retreat position P1. The first retreat position P1 is a position deviated from the molding position P0 when seen in plan view, and the first retreat position P1 becomes a substrate supply position at which the molded substrate 6 is supplied onto the substrate tool 24. Further, the first retreat position P1 may be a position at which the molded substrate 6 (or, the thermoformed article 6A) is detachable from the substrate tool 24. In addition, the molding position P0 and the first retreat position P1 may partially overlap each other when seen in plan view. Further, the frame stand 23 can be omitted, and as long as the bottom panel 22 is movable as described above, an installation place and a shape of the bottom panel 22 are also not limited in particular.

In addition, a plurality of vent holes 2b communicating with the chamber 2A are formed in an outer circumferential edge of the bottom panel 22. The vent holes 2b are connected to a vacuum pump (not shown). Upon molding, as the vacuum pump is operated to evacuate the chamber 2A, the chamber 2A is depressurized.

The substrate tool 24 is formed of a metal or the like disposed on the bottom panel 22. A holding section 24a configured to hold the molded substrate 6 that is adhered thereto and formed of a resin or the like is formed on an upper section of the substrate tool 24.

The holding section 24a is formed in a shape slightly smaller than that of the molded substrate 6 when seen in plan view.

For this reason, an outer circumferential portion of the molded substrate 6 extends outward from a side circumferential surface of the holding section 24a, and the molded substrate 6 is holdable with respect to the substrate tool 24 in a state in which the molded substrate 6 covers an upper section of the holding section 24a.

Then, as compressed air is introduced into the chamber 2A from the upper hot plate 3A by a pressure tank or the like (not shown), the sheet 4 is lowered toward the bottom panel 22. Then, the molded substrate 6 held by the substrate tool 24 is covered and adhered by the sheet 4.

The upper hot plate 3A is a flat-plate-shaped component configured to soften the sheet 4 by suctioning the sheet 4 to the lower surface and heating the sheet 4. The upper hot plate 3A has the first heating surface 3a1 constituted of a planar surface on the lower surface.

The upper hot plate 3A is provided to ascend and descend in a vertical direction approaching or moving away from the molding position P0 disposed thereunder. Then, in a state in which the upper hot plate 3A is moved downward, the upper hot plate 3A is disposed while being closely adhered to the frame upper edge portion 21a of the lower frame 2 disposed on the molding position P0 from above.

Further, an expansion device (not shown) having a rod that expands and contracts in the vertical direction is provided above the upper hot plate 3A. The upper hot plate 3A is movable in the vertical direction by the expansion device.

A plurality of heaters 31 are provided on an upper surface 3c of the upper hot plate 3A at predetermined intervals. A plurality of vent holes 32 opening in the first heating surface 3a1 are formed in the first heating surface 3a1 of the upper hot plate 3A at predetermined intervals. Each of the vent holes 32 is connected to be switchable between a vacuum pump (not shown) and a booster pump (not shown). The vacuum pump includes a vacuum tank configured to vacuum suction the first heating surface 3a1 side. The booster pump includes a pressure tank configured to store air compressed by a compressor.

According to the above-mentioned configuration, upon thermoforming, connection to the vacuum tank and the pressure tank can be appropriately switched, and the vacuum tank maintained in a vacuum state can be opened to vacuum suction the sheet 4 through the vent holes 32 to closely attach the sheet 4 to the first heating surface 3a1. In addition, the compressed air supplied from the pressure tank through the vent holes 32 can be supplied into the chamber 2A from the first heating surface 3a1 and pressurized, and the sheet 4 can be lowered toward the molded substrate 6. A degree of vacuum can be increased through direct suction by driving of the vacuum pump without providing a vacuum tank.

The lower hot plate 3B is a flat-plate-shaped component configured to heat the sheet 4 at an upper surface side from below using radiant heat. The lower hot plate 3B has the second heating surface 3b1 formed on an upper surface as a flat surface. The lower hot plate 3B is provided to be movable forward and backward in a lateral direction with respect to a position below the upper hot plate 3A (the molding position P0 in the embodiment). That is, as described above, the lower hot plate 3B is provided to be freely movable along, for example, a slide rail or the like (not shown) between the molding position P0 and the second retreat position P2. In a state in which the lower hot plate 3B is disposed at the molding position P0, the second heating surface 3b1 is set to be disposed at a height at a predetermined gap in the vertical direction from the first heating surface 3a1 of the upper hot plate 3A disposed at a heating position. A plurality of heaters 33 are provided on a lower surface 3d of the lower hot plate 3B at predetermined intervals.

The second retreat position P2 is not particularly limited as long as the position does not interfere with other members such as the sidewall 21 or the like of the lower frame 2 disposed at the molding position P0.

The sheet 4 is a known multi-layered sheet having a printing layer and a protective film or a carrier film (not shown) formed on a front surface of the printing layer, and an adhesive layer formed on a back surface of the printing layer. The sheet 4 is formed of a material which can be heated and formed by the heating plates 3A and 3B and solidified upon cooling. In the embodiment, a roll sheet wound in a roll shape is employed as the sheet 4.

The molded substrate 6 is an object to which the sheet 4 is covered and adhered, for example, a main body of a molded product formed of a thermoplastic resin such as a polypropylene-based resin, a polyethylene-based resin, or the like. However, a material of the molded substrate 6 is not limited to the resin.

As shown in FIG. 1, the sheet transport apparatus 5 is provided to supply the sheet 4 to a position between the heating surfaces 3a1 and 3b1 of the hot plates 3A and 3B. The sheet transport apparatus 5 includes a sheet support section 52, a sheet-unwinding section 58, a sheet-cutting section 54 and a cut sheet-holding section 56, which are components for accomplishing the above-mentioned purposes.

The sheet support section 52 supports the sheet 4 such that it can be unwound. The sheet support section 52 is configured to sandwich and support the sheet 4 at a position at which unwinding of the sheet 4 is started, from a roll section 51 that supports a core 4x of the sheet 4. The sheet support section 52 may be configured to pass the sheet 4 therethrough in an unwinding direction D1 of the sheet 4 along an extending direction of the heating surfaces 3a1 and 3b1 of the hot plates 3A and 3B or simply may be configured to place the sheet 4 thereon.

The sheet-unwinding section 58 is configured to detachably hold the sheet end 4e of the sheet 4, and unwind a sheet end 4e of the sheet below the first heating surface 3a1 of the upper hot plate 3A in the unwinding direction D1. For example, the sheet-unwinding section 58 is provided to be able to reciprocate in the unwinding direction D1 and a returning direction D2 opposite to the unwinding direction D1. That is, the sheet-unwinding section 58 can freely reciprocate between the position shown by a solid line in FIG. 1 and a position shown by a double dotted-dashed line in FIG. 1.

The sheet-cutting section 54 is disposed in front of the sheet support section 52 in the unwinding direction D1. The sheet-cutting section 54 has a configuration in which the sheet 4 held by the sheet-unwinding section 58 is cut on a rear side in the unwinding direction D1 of the heating surfaces 3a1 and 3b1 of the hot plates 3A and 3B. For example, the sheet-cutting section 54 may be a cutter extending in a widthwise direction of the sheet 4, or may be a cutter that can scan the sheet 4 parallel to the widthwise direction of the sheet 4. In addition, the cutter may be configured to be able to ascend and descend in a direction approaching or moving away from the sheet 4.

The cut sheet-holding section 56 is disposed in front of the sheet-cutting section 54 in the unwinding direction D1. The cut sheet-holding section 56 has a configuration of holding the sheet end 4e of the sheet 4 cut by the sheet-cutting section 54. The cut sheet-holding section 56 is constituted by, for example, a member able to ascend and descend in a direction approaching or moving away from the sheet 4.

The sheet transport apparatus 5 configured as above can continuously supply the sheet 4 in the extending direction of the heating surfaces 3a1 and 3b1 every time the thermoformed product 6A is formed while sequentially unwinding the sheet 4 in the unwinding direction D1 of the sheet 4 by the sheet-unwinding section 58 and cutting the sheet 4 by the sheet-cutting section 54.

Then, as shown in FIGS. 4 to 9, the thermoforming device 1 is configured to dispose the sheet 4 along the first heating surface 3a1 of the upper hot plate 3A by the sheet transport apparatus 5, to move the lower hot plate 3B to the molding position P0, to heat the sheet 4 by the upper hot plate 3A and the lower hot plate 3B, to retract the lower hot plate 3B to the second retreat position P2, to move the lower frame 2 disposed at the first retreat position P1 and holding the molded substrate 6 on the substrate tool 24 to the molding position P0, to sandwich the sheet 4 softened through heating by lowering of the upper hot plate 3A between the frame upper edge portion 21a and the upper hot plate 3A, and to control a control unit (not shown) such that air is compressed through the vent holes 32 of the first heating surface 3a1 of the upper hot plate 3A.

Further, a cutting tool (not shown) is provided on, for example, the lower frame 2 and has a blade section disposed to be directed upward. The cutting tool is disposed at a position facing the molded substrate 6 held on the substrate tool 24 at a predetermined gap therefrom in the vertical direction. Since the cutting tool is configured in this way, the blade section of the cutting tool can perform trimming by cutting the sheet 4 covered on the molded substrate 6.

Next, a thermoforming method when the thermoformed product 6A is molded using the above-mentioned thermoforming device 1, and actions of the thermoforming device and the thermoforming method will be described with reference to the accompanying drawings.

Further, a state in which the lower frame 2, the upper hot plate 3A and the lower hot plate 3B are disposed at positions shown in FIG. 1 is referred to as an initial state. That is, the initial state is a state in which the upper hot plate 3A is disposed above the molding position P0, the lower frame 2 is disposed at the first retreat position P1, and the lower hot plate 3B is disposed at the second retreat position P2.

Figure 4:
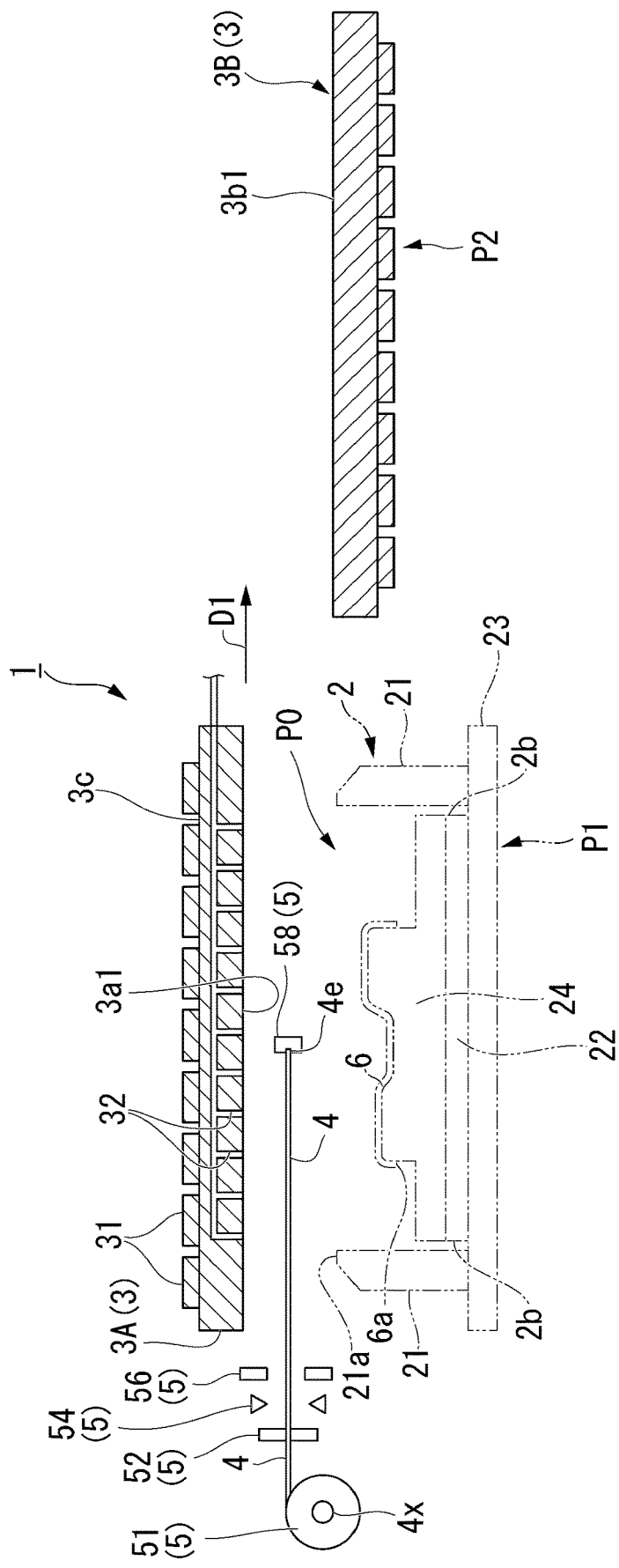
FIG. 4 is a side view describing a thermoforming method using the thermoforming device shown in FIG. 1.

As shown in FIG. 4, first, the molded substrate 6 is installed on the substrate tool 24 disposed on the bottom panel 22 of the lower frame 2 positioned at the first retreat position P1. Accordingly, the molded substrate 6 is held on the substrate tool 24 in a state where the molded substrate 6 is adhered on the substrate tool 24. Further, a first process of mounting the molded substrate 6 on the substrate tool 24 may be at any timing as long as the lower frame 2 is in a state of being disposed at the first retreat position P1 as shown in FIG. 2 (a second process to a fourth process, which will be described below).

Then, a second process of supplying the sheet 4 to extend along the first heating surface $3a1$ of the upper hot plate 3A by the sheet transport apparatus 5 is performed. Specifically, the sheet end $4e$ of the sheet 4 is held by the sheet-unwinding section 58 previously moved to the rear side in the unwinding direction D1. After that, the sheet-unwinding section 58 that holds the sheet end $4e$ is moved toward a front side in the unwinding direction D1 of the first heating surface $3a1$ of the upper hot plate 3A along the unwinding direction D1. Then, when movement of the sheet-unwinding section 58 is terminated, the sheet 4 is disposed below the first heating surface $3a1$ of the upper hot plate 3A.

Then, the unwound sheet 4 is cut by the sheet-cutting section 54 and separated from the roll section 51.

Figure 5:
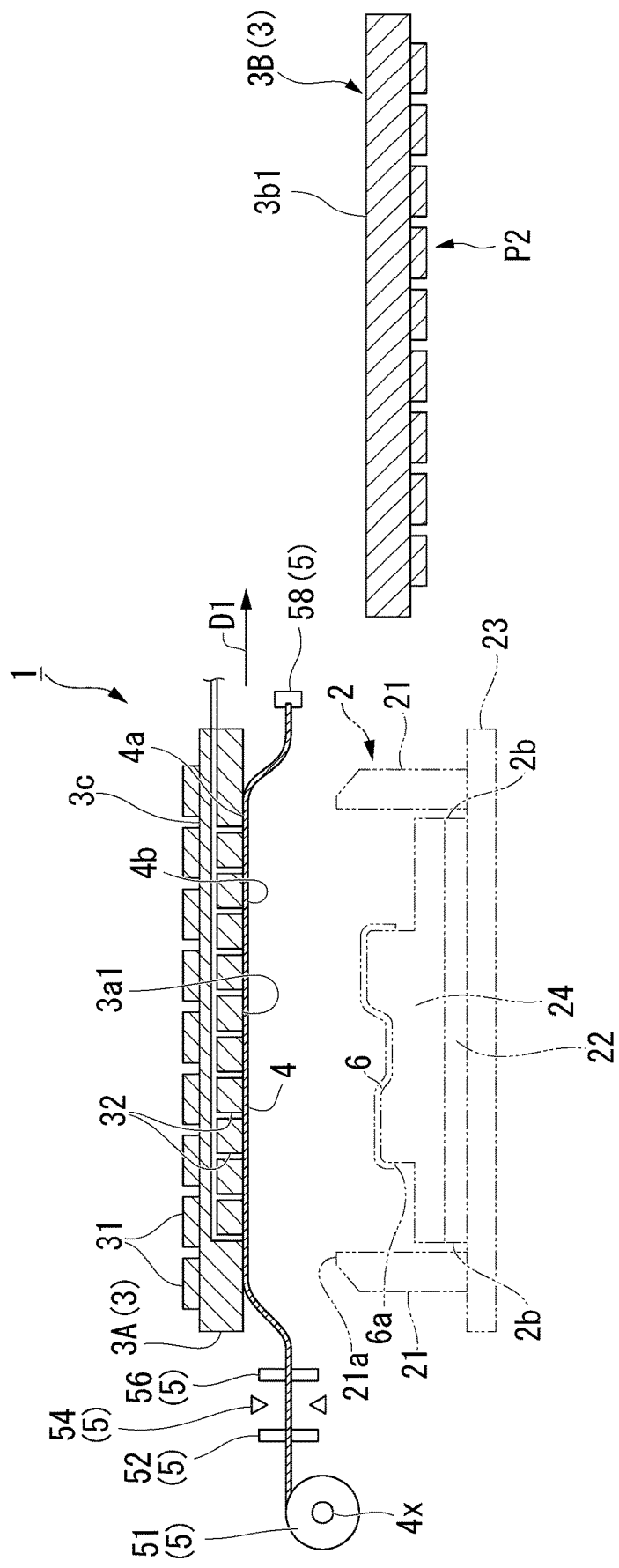
FIG. 5 is a side view describing the thermoforming method following FIG. 4.
Figure 6:
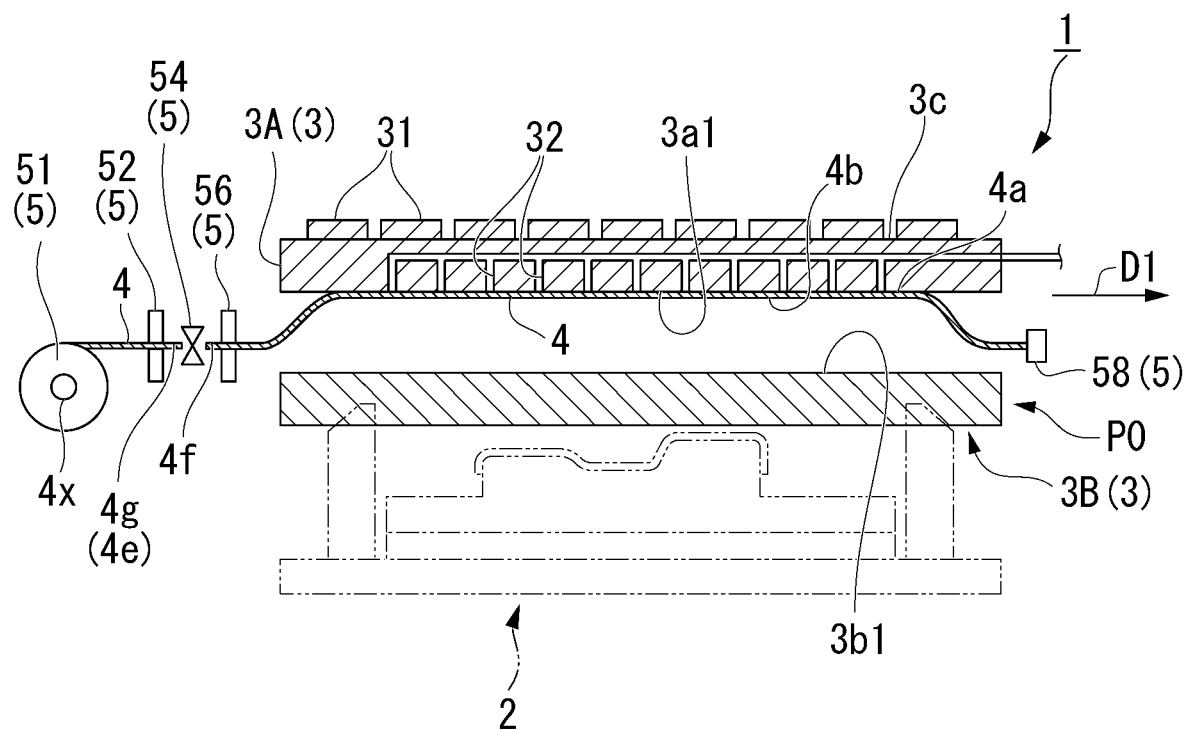
FIG. 6 is a side view describing the thermoforming method following FIG. 5.

Next, as shown in FIGS. 5 and 6, in a third process, the lower hot plate 3B disposed at the second retreat position P2 is moved in a lateral direction to be disposed at the molding position P0. The second heating surface $3b1$ of the lower hot plate 3B disposed at the molding position P0 faces the first heating surface $3a1$ of the upper hot plate 3A in the vertical direction while the sheet 4 is interposed therebetween as shown in FIG. 6. Here, the second heating surface $3b1$ is disposed at a predetermined gap from a lower surface $4b$ of the sheet 4.

Further, in the above-mentioned second process and third process, the third process may be performed prior to the second process, or both of the processes may be performed substantially simultaneously.

After that, a fourth process of heating the sheet 4 is performed by the upper hot plate 3A and the lower hot plate 3B. As shown in FIGS. 5 and 6, the upper hot plate 3A is heated by the heaters 31, and the above-mentioned vacuum pump in the upper hot plate 3A is operated to evacuate and suction a space between the first heating surface $3a1$ and the sheet 4 and decompress the space through the vent holes 32. Accordingly, the sheet 4 is suctioned to the first heating surface $3a1$ and heated. Here, the sheet 4 is heated by a contact with the first heating surface $3a1$ from an upper surface $4a$ thereof.

Meanwhile, the lower hot plate 3B is heated by a heater (not shown), and the lower surface $4b$ of the sheet 4 is heated by radiant heat of the lower hot plate 3B.

Next, as shown in FIG. 7, after termination of the heating process (the fourth process) of the sheet 4, a fifth process of moving the lower frame 2 to the molding position P0 is performed.

In the fifth process, first, the lower hot plate 3B is laterally moved from the molding position P0 to the second retreat position P2 in the arrow D1 direction. After that, the lower frame 2 in a state in which the molded substrate 6 is held is moved to the molding position P0 provided with a gap from the first retreat position P1 in the arrow D3 direction shown in FIG. 2, i.e., a position below the upper hot plate 3A. Here, the sheet 4 is in a state of being suctioned to the first heating surface $3a1$ of the upper hot plate 3A. Then, the upper hot plate 3A and the lower frame 2 are disposed to overlap each other when seen in plan view.

Next, as shown in FIG. 6, in a sixth process, the previously unwound sheet 4 is cut to a size sufficient for covering and adhesion to the molded substrate 6.

Specifically, in the unwinding direction of the sheet 4, the sheet 4 is cut by the sheet-cutting section 54 on a rear side of the first heating surface $3a1$ of the upper hot plate 3A in the unwinding direction D1, i.e., between the sheet support section 52 and the cut sheet-holding section 56. The sheet 4 is also held by the cut sheet-holding section 56 before and after cutting the sheet 4. In this way, as the sheet 4 is held by both of the support member of the sheet support section 52 and the cut sheet-holding section 56, after cutting the sheet 4, a sheet end $4f$ is held by the cut sheet-holding section 56 and a sheet end $4g$ is supported by the sheet support section 52.

Next, in a seventh process, as shown in FIG. 7, the lower frame 2 that accommodates the molded substrate 6 approaches relatively close to the upper hot plate 3A. Then, the lower frame 2 contacts the upper hot plate 3A with the sheet 4 therebetween, and the inside of the chamber 2A is brought into a closed state. In the thermoforming method according to the embodiment, the upper hot plate 3A is moved downward, and the outer circumferential portion of the first heating surface $3a1$ is brought into close contact with the frame upper edge portion $21a$ of the lower frame 2 with the sheet 4 interposed therebetween. Here, the sheet 4 is sandwiched between the frame upper edge portion $21a$ and the upper hot plate 3A throughout the entire circumference with no gap. In addition, the chamber 2A is formed into a closed space when an upper opening of the lower frame 2 is closed.

Figure 8:
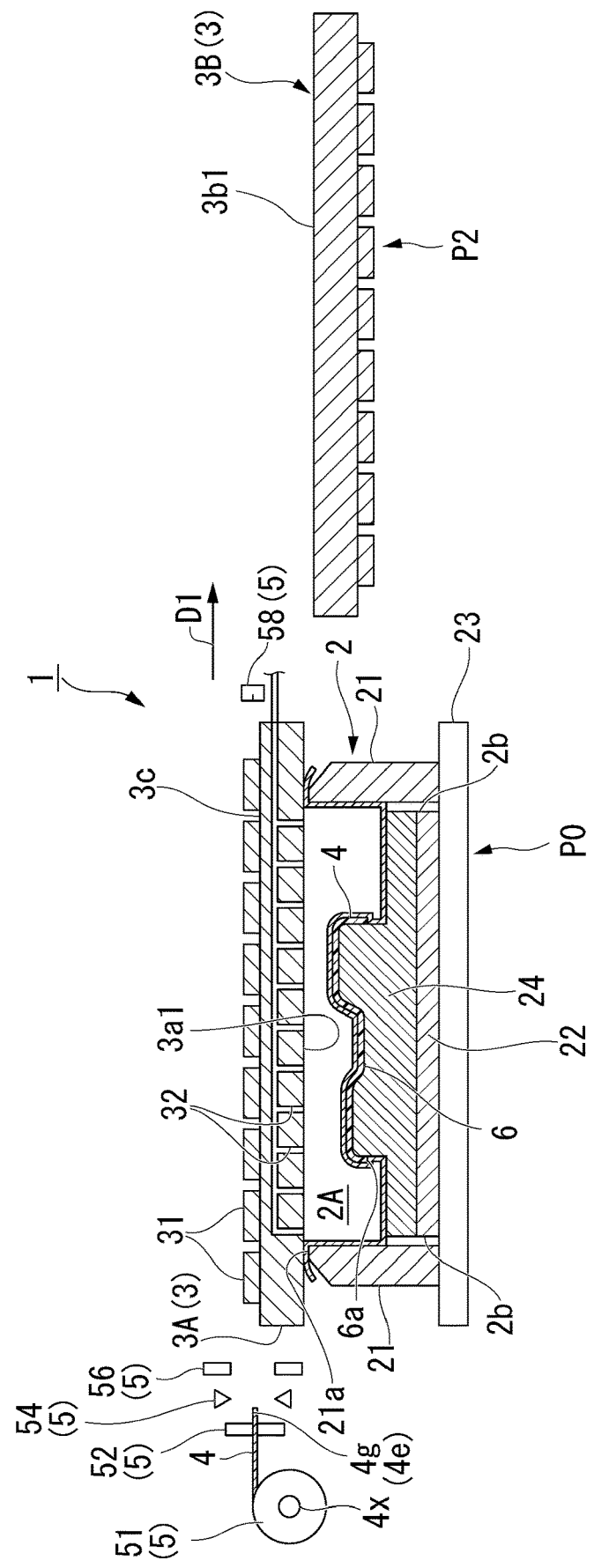
FIG. 8 is a side view describing the thermoforming method following FIG. 7.

Next, as shown in FIG. 8, in an eighth process, the closed space in the chamber 2A surrounded by the sheet 4 and the lower frame 2 is depressurized and the front surface $6a$ of the molded substrate 6 is covered with the sheet 4.

Specifically, the sheet 4 is suctioned using a vacuum in a downwardly moving direction via the vent holes $2b$ of the bottom panel 22 of the lower frame 2. Accordingly, the air in the chamber 2A is suctioned toward the bottom panel 22, and the chamber 2A is depressurized to reach a high degree of vacuum.

Then, in a state in which a depressurizing operation of the chamber 2A is maintained, a suctioning operation of the sheet 4 is stopped, and a space between the upper hot plate 3A and the sheet 4 is opened to the atmosphere. That is, the sheet 4 suctioned to the first heating surface $3a1$ of the upper hot plate 3A is heated to a predetermined temperature, and after a predetermined time elapses, vacuum suctioning of the vent holes 32 of the upper hot plate 3A is stopped to stop a suctioning operation. Accordingly, since the space between the upper hot plate 3A and the sheet 4 is opened to the atmosphere, a pressure difference is generated in the upper and lower spaces with the sheet 4 interposed therebetween. Accordingly, the sheet 4 softened by the heating is separated from the first heating surface $3a1$ of the upper hot plate 3A and moves toward the bottom panel 22 (the molded substrate 6) side. Then, the sheet 4 is closely pressed to cover the front surface $6a$ of the molded substrate 6, and covered and adhered onto the front surface $6a$ of the molded substrate 6. After that, trimming of the sheet 4 is performed by cutting the covered sheet 4 along an appropriate cut-off line using a cutting tool.

Further, when the space between the upper hot plate 3A and the sheet 4 is exposed to the atmosphere, the compressed air may be ejected from the vent holes 32 of the upper hot plate 3A to pressurize the space between the sheet 4 and the first heating surface 3a1 by switching the vacuum tank connected to the upper hot plate 3A and the sheet 4 to the pressure tank.

Figure 9:
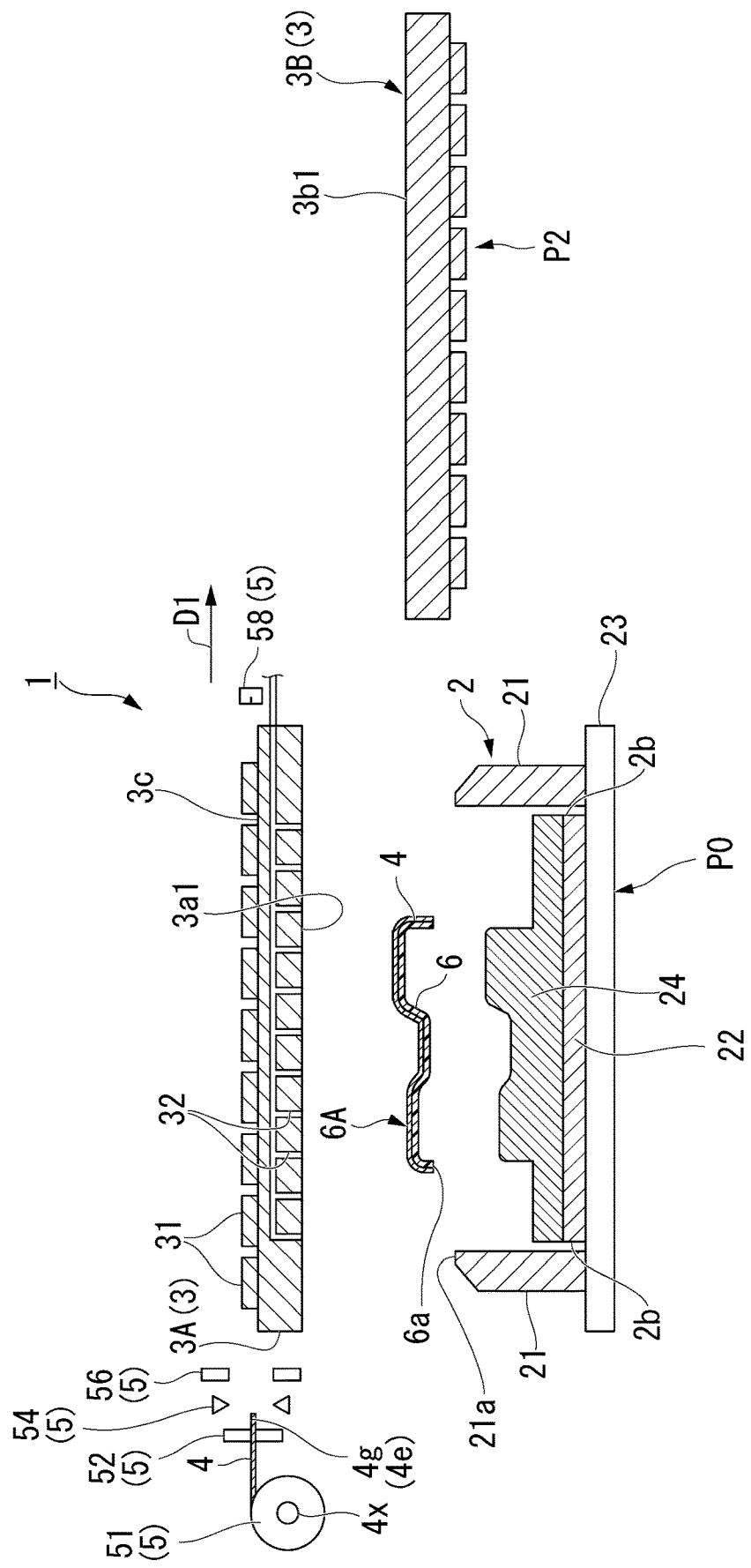
FIG. 9 is a side view describing the thermoforming method following FIG. 8.

Next, as shown in FIG. 9, a ninth process of removing the thermoformed product 6A thermoformed when the molded substrate 6 is coated with the sheet 4 from the substrate tool 24 is performed.

In the ninth process, the upper hot plate 3A is moved upward, and the lower frame 2 is moved from the molding position P0 in a direction of moving away from the upper hot plate 3A and a horizontal direction when seen in plan view to be moved to the first retreat position P1 (see FIG. 2). Then, the thermoformed product 6A is separated and removed from the substrate tool 24 at the first retreat position P1.

The thermoformed product 6A is completed by the above-mentioned operations, and a series of molding operations for thermoforming a thermoformed product 6A is terminated.

When a plurality of molded substrates 6 are covered with the sheet 4 and performing continuous thermoforming, in the arrangement shown in FIG. 9, the sheet end 4g supported by the sheet support section 52 is substituted with a new sheet end 4e, and the processes from the above-mentioned first process to ninth process may be sequentially performed.

Next, actions of the thermoforming device and the thermoforming method will be described with reference to the accompanying drawings.

In the embodiment, as shown in FIG. 6, the upper surface 4a side of the sheet 4 is heated by the first heating surface 3a1 of the upper hot plate 3A, and the lower surface 4b side is heated by the second heating surface 3b1 of the lower hot plate 3B. For this reason, since both of the upper and lower surfaces 4a and 4b of the sheet 4 are simultaneously heated, a reduction in heating time can be achieved.

Then, after the sheet 4 is softened by the heating, the lower hot plate 3B is moved in a lateral direction from a position below the upper hot plate 3A to be retracted to the second retreat position P2. Accordingly, the entire front surface 6a of the molded substrate 6 of the lower frame 2 can be uniformly covered with the sheet 4.

In this way, since the upper hot plate 3A and the lower hot plate 3B are configured to simultaneously heat both of the upper and lower surfaces 4a and 4b of the sheet 4, a temperature of the upper hot plate 3A may be lowered to the heat the sheet 4. For this reason, it is possible to prevent a surface roughness of the first heating surface 3a1 from being transferred to the upper surface 4a of the sheet 4 due to heating of the upper hot plate 3A. For this reason, a decrease in design properties of the front surface of the thermoformed product 6A after thermoforming can be suppressed.

In addition, in the embodiment, since the sheet 4 can be heated from the lower surface 4b side of the sheet 4, to which an adhesive agent is adhered, by the lower hot plate 3B, the adhesive agent can be sufficiently softened. For this reason, an adhesive strength of the sheet adhered to the molded substrate 6 can be improved.

Further, in the embodiment, since both of the upper and lower surfaces 4a and 4b of the sheet 4 can be heated, the embodiment can also cope with a sheet having a large thickness. That is, even with a sheet having a thickness such that the lower surface 4b of the sheet cannot be heated to a required temperature when heated by only the upper hot plate, the entire sheet can be die-molded by heating the lower surface 4b of the sheet using the lower hot plate 3B. Alternatively, the sheet can be heated to a sheet-softening temperature required for coating the entire sheet.

In addition, in the embodiment, since the upper hot plate 3A and the lower hot plate 3B are individually provided, it is possible to adjust temperature such that different temperatures are applied between the upper hot plate 3A and the lower hot plate 3B. For this reason, for example, the temperature of the lower surface 4b of the sheet can be made higher than the upper surface 4a of the sheet. For this reason, transfer to the upper surface 4a of the sheet due to a high temperature of the upper hot plate 3A can be prevented, and the adhesive agent on the lower surface 4b of the sheet can be sufficiently softened due to a high heating temperature of the lower hot plate 3B.

Accordingly, according to conditions of the sheet 4 such as a material, a thickness dimension, or the like, of the sheet 4, appropriate heating to the sheet 4 can be performed, and a quality of the thermoformed product 6A can be improved.

In addition, in the embodiment, the upper hot plate 3A is configured such that the sheet 4 can be suctioned to and contacted with the first heating surface 3a1 to be heated. Meanwhile, the lower hot plate 3B is configured to heat the lower surface 4b of the sheet using radiant heat from the second heating surface 3b1. For this reason, both of the upper and lower surfaces 4a and 4b of the sheet 4 can be heated by having the lower hot plate 3B which has a simple structure including, for example, only a heater configured to heat the second heating surface 3b1.

In addition, in the embodiment, during heating of the sheet 4, the lower frame 2 can be retracted from the molding position P0 to dispose the lower hot plate 3B at the molding position P0. Then, after termination of the heating of the lower hot plate 3B, the lower hot plate 3B can be retracted from the molding position P0 and the lower frame 2 can be disposed at the molding position P0 to cover the molded substrate with the sheet 4. For this reason, since the lower hot plate 3B and the lower frame 2 can be switched alternately at the molding position P0, a height of the entire thermoforming device 1 can be suppressed.

In the thermoforming device and the thermoforming method according to the above-mentioned embodiment, a reduction in heating time of the sheet 4 can be achieved, and improvement of design properties of the thermoformed product 6A can be achieved.

Hereinabove, while the thermoforming device and the thermoforming method according to the embodiment of the present invention have been described, the present invention is not limited to the embodiment and may be appropriately changed without departing from the scope of the present invention.

For example, while the upper hot plate 3A is configured to move vertically in the above-mentioned embodiment, the embodiment is not limited thereto, and the lower frame 2 and the upper hot plate 3A may relatively approach each other in the vertical direction. In addition, the position of the upper hot plate 3A may be fixed, and the lower frame 2 may be provided to be vertically movable with respect to the upper hot plate 3A. Alternatively, each of the lower frame 2 and the upper hot plate 3A may be configured to be movable in the vertical direction. Accordingly, the position of the lower frame 2 is not limited thereto, and during thermoforming, the upper hot plate 3A and the lower frame 2 may be provided to overlap each other when seen in plan view.

In addition, while heating by the upper hot plate 3A and the lower hot plate 3B are simultaneously performed in the thermoforming method according to the above-mentioned embodiment, a timing of the above-mentioned heating is not limited. The timing of heating by the upper hot plate 3A and the lower hot plate 3B may be changed. For example, heating by the lower hot plate 3B can be performed before heating by the upper hot plate 3A. On the other hand, heating by the lower hot plate 3B may be performed after heating by the upper hot plate 3A. The timings of heating by the upper hot plate 3A and the lower hot plate 3B can be set according to conditions such as a material and a thickness of the sheet 4, a type of an adhesive agent, a material of the molded substrate 6, and on the like. For this reason, the heating temperature can be accurately adjusted by providing the hot plates 3A and 3B above and below the sheet 4.

In addition, a protective film may be formed on the adhering surface (the lower surface 4b) of the sheet 4 to which an adhesive agent is attached. In this case, the protective film is peeled off simultaneously with or immediately before the supply of the sheet 4 to the heating surface of the hot plate 3 using the sheet transport apparatus 5.

Further, in the above-mentioned embodiment, the lower frame 2 is configured to move between the first retreat position P1 and the molding position P0 in the lateral direction (the arrow D3 direction shown in FIG. 2). However, the lower frame 2 is not limited to moving with respect to the molding position P0 in the lateral direction. For example, the first retreat position P1 may be an appropriate position to which the lower frame 2 is moved below the molding position P0, and a position at which the molded substrate 6 is attached to or detached from the bottom panel 22 (a base) in the lower frame 2.

Further, while the above-mentioned embodiment is applied to the thermoforming method in which the sheet 4 is coated and adhered to the molded substrate 6, the embodiment is not limited to the case of such lamination molding and may include a case in which a carrier film on the uppermost layer of the sheet is peeled off through trimless transfer and only a decorative layer (corresponding to the sheet of the present invention) is transferred to the molded substrate.

Further, while the above-mentioned embodiment is applied to the thermoforming method of covering the molded substrate 6 with the sheet 4 softened by the hot plate 3, the embodiment is not limited to this sheet covering. For example, it is also possible to form a thermoformed product using the sheet 4 softened by heating of the hot plate 3 as a target of a die-mold configured to use the substrate tool 24 as a mold. Also in the case of this die-mold, the thermoforming method can be performed using the same method as that of the above-mentioned embodiment.

Furthermore, the method of supplying the sheet 4 to the heating surface is not limited to the sheet transport apparatus 5 using a roll sheet wound in a roll shape like the above-mentioned embodiment and a sheet transport apparatus having another configuration may be used. For example, the embodiment may be applied to a method of using a sheet transport apparatus configured such that a sheet-accommodating section configured to accommodate a plurality of cut sheets of a type previously cut to a predetermined size is provided, and a plurality of cut sheets accommodated in the sheet-accommodating section are unloaded one by one and supplied in an extending direction (i.e., the unwinding direction D1) of the heating surfaces 3a1 and 3b1 of the hot plate 3.

In addition, shapes and sizes of the lower frame 2 (the stand 23, the substrate tool 24, or the like), the upper hot plate 3A and the lower hot plate 3B, and configurations of a cutting means or the like of a sheet can be appropriately set.

Further, a trimming process may be performed at the same time as the molding like in the above-mentioned embodiment, or may be performed in another process after molding.

In addition, the components in the above-mentioned embodiment can be appropriately substituted with known components without departing from the scope of the present invention.

DESCRIPTION OF REFERENCE SIGNS

1 Thermoforming device
2 Lower frame (substrate-supplying unit)
2A Chamber
3 Hot plate
3A Upper hot plate
3B Lower hot plate
3a1 First heating surface
3b1 Second heating surface
4 Sheet
5 Sheet transport apparatus
6 Molded substrate
6A Thermoformed article
6a Front surface
21 Sidewall
21a Frame upper edge portion
22 Bottom panel (base)
23 Stand
24 Substrate tool
P0 Molding position
P1 First retreat position
P2 Second retreat position

The invention claimed is:
1. A thermoforming device, comprising:
an upper hot plate, an outer surface of the upper hot plate comprising a first heating surface configured to heat a sheet from above;
a lower hot plate comprising a second heating surface configured to heat the sheet from below; and
a substrate-supplying unit comprising a base and a sidewall, the base being configured to hold a molded substrate, and configured to attach the molded substrate to and detach the molded substrate from the base and to dispose the molded substrate at a molding position below the first heating surface with the sheet interposed therebetween, wherein
the upper hot plate and the lower hot plate are configured to heat the sheet simultaneously from an upper surface and a lower surface of the sheet,
the lower hot plate is provided to be movable in a horizontal direction with respect to a position below the upper hot plate, and
the thermoforming device die-molds or adheres, onto the molded substrate held by the base, the sheet softened by being heated by the upper hot plate and the lower hot plate,
wherein the upper hot plate suctions the sheet to the first heating surface, and the first heating surface contacts and heats the upper surface of the sheet,
the lower hot plate is disposed below the sheet with a gap therebetween and is configured to heat the lower surface of the sheet using radiant heat from the second heating surface,
a portion of the first heating surface, which contacts the upper surface of the sheet, is disposed in a position facing in a vertical direction a space surrounded by the base and the sidewall when the sidewall of the substrate-supplying unit contacts the upper hot plate through the sheet, and the thermoforming device is programmed to make the upper hot plate and the lower hot plate simultaneously heat the sheet from the upper surface and the lower surface of the sheet in a state where no closed space formed by the substrate-supplying unit and the upper hot plate is provided around the sheet by the substrate-supplying unit being separated from the upper hot plate.

2. The thermoforming device according to claim 1, wherein the substrate-supplying unit is provided to be movable between the molding position disposed below the upper hot plate and a retreat position provided with a gap from the molding position.

3. A thermoforming method using a thermoforming device comprising:

an upper hot plate, an outer surface of the upper hot plate comprising a first heating surface configured to heat a sheet from above;

a lower hot plate comprising a second heating surface configured to heat the sheet from below; and a substrate-supplying unit comprising a base and a sidewall, the base being configured to hold a molded substrate, and configured to attach the molded substrate to and detach the molded substrate from the base, and to dispose the molded substrate at a molding position below the first heating surface with the sheet interposed therebetween, the thermoforming method comprising:

installing the molded substrate on the base and disposing the base at the molding position;

disposing the lower hot plate at a position below the upper hot plate with a gap therebetween;

disposing the sheet between the upper hot plate and the lower hot plate;

heating upper and lower surfaces of the sheet using the upper hot plate and the lower hot plate, respectively, in a state where no closed space formed by the substrate-supplying unit and the upper hot plate is provided around the sheet by the substrate-supplying unit being separated from the upper hot plate;

retracting the lower hot plate from the position below the upper hot plate and forming a closed space below the sheet and surrounded by the sheet and the substrate-supplying unit; and depressurizing an inside of the closed space, and die-molding the sheet softened by the heating, or adhering the sheet to the molded substrate, wherein, when the upper and lower surfaces of the sheet are heated using the upper hot plate and the lower hot plate:

the upper hot plate suctions the sheet to the first heating surface, and the first heating surface contacts and heats the upper surface of the sheet, the lower hot plate is disposed below the sheet with a gap therebetween and heats the lower surface of the sheet using radiant heat from the second heating surface, and a portion of the first heating surface, which contacts the upper surface of the sheet, is disposed in a position facing in a vertical direction a space surrounded by the base and the sidewall when the sidewall of the substrate-supplying unit contacts the upper hot plate through the sheet.

4. The thermoforming device according to claim 1, wherein the upper hot plate is provided with a heater, and the portion of the first heating surface which contacts the upper surface of the sheet, and the heater are arranged in order in the vertical direction.

5. The thermoforming device according to claim 4, wherein the heater is directly provided on a reverse side of the upper hot plate to the portion of the first heating surface, and the portion of the first heating surface contacts the upper surface of the sheet.

6. The thermoforming device according to claim 1, further comprising a sheet transport apparatus configured to dispose the sheet along the first heating surface of the upper hot plate, wherein a closed space surrounded by the sheet and the substrate-supplying unit is formed when the substrate-supplying unit accommodating the molded substrate relatively approaches and contacts the first heating surface of the upper hot plate in a state where the sheet is suctioned to the first heating surface, and the lower hot plate is configured to have a higher heating temperature than that of the upper hot plate.

\* \* \* \* \*